(12) United States Patent
Huang et al.

(10) Patent No.: US 11,915,462 B1
(45) Date of Patent: Feb. 27, 2024

(54) METHOD AND APPARATUS FOR DETECTING TARGET POINT IN IMAGE, AND COMPUTER STORAGE MEDIUM

(71) Applicant: CONTEMPORARY AMPEREX TECHNOLOGY CO., LIMITED, Fujian (CN)

(72) Inventors: Boxiong Huang, Fujian (CN); Zhiyu Wang, Fujian (CN); Guannan Jiang, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/202,460

(22) Filed: May 26, 2023

Related U.S. Application Data (63) Continuation of application No. PCT/CN2022/115205, filed on Aug. 26, 2022.

(51) Int. Cl.
 *G06V 10/25* (2022.01)
 *G06V 10/82* (2022.01)
 *G06V 10/44* (2022.01)

(52) U.S. Cl.
 CPC .............. *G06V 10/25* (2022.01); *G06V 10/44* (2022.01); *G06V 10/82* (2022.01); *G06V 2201/07* (2022.01)

(58) Field of Classification Search
 CPC ........ G06T 2207/20084; G06T 7/0004; G06N 20/00; G06V 10/40
 See application file for complete search history.

(56) References Cited

U.S. PATENT DOCUMENTS

2011/0142286 A1 6/2011 Morriyama

FOREIGN PATENT DOCUMENTS

| CN | 111476780 | A | | 7/2020 |
|---|---|---|---|---|
| CN | 112084865 | A | | 12/2020 |
| CN | 112184686 | A | | 1/2021 |
| CN | 113052870 | A | | 6/2021 |
| CN | 113744269 | A | * | 12/2021 |
| CN | 113744269 | A | | 12/2021 |
| CN | 114299194 | A | | 4/2022 |
| CN | 216850220 | U | | 6/2022 |
| CN | 114757878 | A | * | 7/2022 |
| CN | 114882459 | A | | 8/2022 |

OTHER PUBLICATIONS

International Search Report and Written Opinion dated Dec. 27, 2022, received for PCT Application PCT/CN2022/115205, filed on Aug. 26, 2022, 17 pages including English Translation.
Extended European search report dated Nov. 10, 2023, in corresponding European patent Application No. 22873947.0, 9 pages.

\* cited by examiner

*Primary Examiner* — Ross Varndell
(74) *Attorney, Agent, or Firm* — XSENSUS LLP (57) ABSTRACT

Embodiments of this application provide a method for detecting a target point in an image. The method may include: obtaining an image under test, where the image under test may include a structure-stable first target object and a structure-unstable second target object; and processing the image under test based on a target point detection model to obtain a target point in the image under test, where the target point may include a feature point on the structure-stable first target object and a feature point on the structure-unstable second target object.

22 Claims, 5 Drawing Sheets

METHOD AND APPARATUS FOR DETECTING TARGET POINT IN IMAGE, AND COMPUTER STORAGE MEDIUM

CROSS-REFERENCE TO RELATED APPLICATION

The present application is a continuation of International Application No. PCT/CN2022/115205, filed Aug. 26, 2022, which is incorporated herein by reference in its entirety.

TECHNICAL FIELD

This application relates to the field of image detection technologies, and in particular, to a method and apparatus for detecting a target point in an image, and a computer-readable storage medium.

BACKGROUND

With development of image processing technologies, an increasing number of image processing technologies are applied to the modern industrial manufacturing field, for example, for detecting a target point in an image (hereinafter referred to as an image under test) of a product under test.

However, in an industrial test procedure, a position at which a product under test is placed is not fixed, such that an image acquisition device shoots the product under test at different angles. In this case, when the product under test is of a complex structure (for example, being prone to deformation and having an irregular structure), a target object in an image under test collected by the image acquisition device varies in shape, resulting in inconsistent information about a target point of the image under test and leading to difficulties in accurately detecting the target point in the image under test.

Therefore, how the target point in the image under test is accurately detected is an urgent technical problem to be resolved.

SUMMARY

Embodiments of this application provide a method and apparatus for detecting a target point in an image, and a computer storage medium, so as to accurately detect a target point in an image under test and effectively detect defects of a product.

According to a first aspect, a method for detecting a target point in an image is provided, including: obtaining an image under test, where the image under test includes a structure-stable first target object and a structure-unstable second target object; and processing the image under test based on a target point detection model to obtain a target point in the image under test, where the target point includes a feature point on the structure-stable first target object and a feature point on the structure-unstable second target object.

In the technical solution of this application, as the structure-stable first target object has a relatively stable shape in the image under test, the feature point on the structure-stable first target object is also at a relatively stable position in the image under test. In addition, as a relatively stable positional relationship is present between the structure-stable first target object and the structure-unstable second target object in the image under test, a relatively stable positional relationship is also present between the feature point of the structure-stable first target object and the feature point of the structure-unstable second target object in the image under test. Therefore, the image including the structure-stable first target object and the structure-unstable second target object is processed using the target point detection model, so that the target point in the image under test can be accurately detected.

In some possible embodiments, the first target object has a structure-stable specified structure, and a partial region of the second target object has a structure-stable specified structure.

In the foregoing implementations, the first target object having information about the structure-stable specified structure and the partial region of the second target object also having information about the structure-stable specified structure not only enhance stability of shapes of the first target object and the second target object in the image under test, but also enhance stability of a positional relationship between the first target object and the second target object. In this way, the image under test is processed using the target point detection model, improving accuracy in detecting the target point in the image.

In some possible embodiments, the method for detecting a target point in an image further includes: training a parameter of the target point detection model based on a sample image and labeled data, where the sample image includes the first target object and the second target object, and the labeled data includes a labeled feature point on the first target object and a labeled feature point on the second target object.

In the foregoing implementations, as the structure-stable first target object has a relatively stable shape in the sample image, the labeled feature point on the structure-stable first target object is also at a relatively stable position in the sample image. In addition, as a relatively stable positional relationship is present between the structure-stable first target object and the structure-unstable second target object in the sample image, a relatively stable positional relationship is also present between the labeled feature point of the structure-stable first target object and the labeled feature point of the structure-unstable second target object in the sample image. Therefore, a target function related to a labeled point on the first target object and a labeled point on the second target object can be obtained through fitting using the parameter of the target point detection model being trained through the sample image having the foregoing features and the labeled data, thereby accurately detecting the target point in the image under test.

In some possible embodiments, the labeled feature point on the first target object is at least one coordinate point on the first target object; and the labeled feature point on the second target object is at least one coordinate point on a region of the second target object having a specified structure.

In the foregoing implementations, as the structure-stable first target object has a relatively stable shape in a plurality of sample images, at least one coordinate point on the structure-stable first target object is also at a relatively stable position in the plurality of sample images. In addition, as the region of the structure-unstable second target object having a specified structure has a relatively fixed shape in the plurality of sample images, at least one coordinate point in the region of the structure-unstable second target object having a specified structure is also at a relatively fixed position in the plurality of sample images, and therefore a relatively stable positional relationship is present between the coordinate points. This helps obtain, through fitting, a more appropriate target function related to the labeled point on the first target object and the labeled point on the second target object, further improving accuracy in detecting the target point in the image under test.

In some possible embodiments, the training a parameter of the target point detection model based on a sample image and labeled data includes: inputting the sample image into a to-be-trained target point detection model to obtain a predicted target point of the sample image; determining a loss value based on the predicted target point and the labeled data; and adjusting the parameter of the target point detection model until the loss value satisfies a first preset loss value to obtain a parameter of the trained target point detection model.

In the foregoing implementations, a training status of a current target point detection model is determined based on a relationship between the loss value and the first preset loss value, and therefore a training process of the target point detection model can be quantized and displayed, so as to determine whether training on the current target point detection model has been completed and output a corresponding parameter after the training has been completed, thereby improving the training efficiency of the target point detection model.

In some possible embodiments, before the training a parameter of the target point detection model based on a sample image and labeled data, the method further includes: obtaining the labeled data based on the sample image and an initial target point detection model.

In the foregoing implementations, the labeled data being obtained based on the sample image and the initial target point detection model makes a relatively stable positional relationship present between the labeled feature point on the first target object and the labeled feature point of the second target object corresponding to a plurality of sample images, enhancing a training effect of the target point detection model.

In some possible embodiments, the obtaining the labeled data based on the sample image and an initial target point detection model includes: inputting the sample image into the initial target point detection model to obtain an initial predicted target point of the sample image; determining an initial loss value based on the initial predicted target point and initial labeled data; and adjusting the initial labeled data to make the initial loss value satisfy a second preset loss value, so as to obtain the labeled data.

In the foregoing implementations, the initial labeled data is adjusted based on a relationship between the initial loss value and the second preset loss value, and therefore a process of determining the labeled data can be quantized and displayed, so as to determine a selection status of current labeled data, thereby improving efficiency of obtaining the labeled data.

In some possible embodiments, the image under test is an image of an adapting piece and a pole that are welded in a battery cell, the first target object is the pole, and the second target object is the adapting piece.

In the foregoing implementations, as a relatively stable positional relationship is present between the pole and the adapting piece, the image of the adapting piece and the pole that are welded in the battery cell can be processed using the target point detection model, so as to accurately detect a target point on the pole and the adapting piece in the image of the adapting piece and the pole that are welded in the battery cell.

In some possible embodiments, the structure-stable specified structure of the first target object includes a groove at a center of the pole.

In the foregoing implementations, as the groove at the center of the pole has stable and symmetrical structure information, a more stable positional relationship is present between the adapting piece and the groove at the center of the pole, so as to better train the target point detection model and accurately detect using the target point detection model, the target point in the image of the adapting piece and the pole that are welded in the battery cell.

In some possible embodiments, the region of the second target object having the structure-stable specified structure includes a tail end of the adapting piece and a region close to a second bend adjacent to the tail end of the adapting piece.

In the foregoing implementations, because the tail end of the adapting piece and the region close to the second bend adjacent to the tail end of the adapting piece has stable structure information, a more stable positional relationship is present between the region and the pole, so as to better train the target point detection model and accurately detect using the target point detection model, the target point in the image of the adapting piece and the pole that are welded in the battery cell.

In some possible embodiments, the labeled feature point on the first target object is a coordinate point of an end point of the groove at the center of the pole; and the labeled feature point on the second target object includes a coordinate point of the tail end of the adapting piece and a coordinate point in the region close to the second bend adjacent to the tail end of the adapting piece.

In the foregoing implementations, the labeled feature point on the first target object is set as the coordinate point of the end point of the groove at the center of the pole, and the labeled feature point on the second target object is set as the coordinate point of the tail end of the adapting piece and the coordinate point in the region close to the second bend adjacent to the tail end of the adapting piece, which makes a stable association relationship present between the feature labeled point on the first target object and the feature point on the second target object, helping the target point detection model learn an association relationship between the feature labeled points.

In some possible embodiments, the target point detection model is a residual neural network.

In the foregoing implementations, the target point detection model being set as the residual neural network can prevent overfitting in the training process, so as to more accurately detect the target point in the image under test.

According to a second aspect, an apparatus for detecting a target point in an image is provided. The apparatus includes an obtaining module or circuitry and a processing module or circuitry. The obtaining module is configured to obtain an image under test, where the image under test includes a structure-stable first target object and a structure-unstable second target object. The processing module is configured to process the image under test based on a target point detection model to obtain a target point in the image under test, where the target point includes a feature point on the structure-stable first target object and a feature point on the structure-unstable second target object.

In the technical solution of this application, as the structure-stable first target object has a relatively stable shape in the image under test, the feature point on the structure-stable first target object is also at a relatively stable position in the image under test. In addition, as a relatively stable positional relationship is present between the structure-stable first target object and the structure-unstable second target object in the image under test, a relatively stable positional relationship is also present between the feature point of the structure-stable first target object and the feature point of the structure-unstable second target object in the image under test. Therefore, the image including the structure-stable first target object and the structure-unstable second target object is processed using the target point detection model, so that the target point in the image under test can be accurately detected.

In some possible embodiments, the first target object has a specified structure, and a partial region of the second target object has a structure-stable specified structure.

In the foregoing implementations, the first target object having information about the structure-stable specified structure and the partial region of the second target object also having information about the structure-stable specified structure not only enhance stability of shapes of the first target object and the second target object in the image under test, but also enhance stability of a positional relationship between the first target object and the second target object. In this way, the image under test is processed using the target point detection model, improving accuracy in detecting the target point in the image.

In some possible embodiments, the apparatus further includes: a training module or circuitry, configured to train a parameter of the target point detection model based on a sample image and labeled data, where the sample image includes the first target object and the second target object, and the labeled data includes a labeled feature point on the first target object and a labeled feature point on the second target object.

In the foregoing implementations, as the structure-stable first target object has a relatively stable shape in the sample image, the labeled feature point on the structure-stable first target object is also at a relatively stable position in the sample image. In addition, as a relatively stable positional relationship is present between the structure-stable first target object and the structure-unstable second target object in the sample image, a relatively stable positional relationship is also present between the labeled feature point of the structure-stable first target object and the labeled feature point of the structure-unstable second target object in the sample image. Therefore, a target function related to a labeled point on the first target object and a labeled point on the second target object can be obtained through fitting using the parameter of the target point detection model being trained through the sample image having the foregoing features and the labeled data, thereby accurately detecting the target point in the image under test.

In some possible embodiments, the labeled feature point on the first target object is at least one coordinate point on the first target object; and the labeled feature point on the second target object is at least one coordinate point on a region of the second target object having a specified structure.

In the foregoing implementations, as the structure-stable first target object has a relatively stable shape in a plurality of sample images, at least one coordinate point on the structure-stable first target object is also at a relatively stable position in the plurality of sample images. In addition, as the region of the structure-unstable second target object having a specified structure has a relatively fixed shape in the plurality of sample images, at least one coordinate point in the region of the structure-unstable second target object having a specified structure is also at a relatively fixed position in the plurality of sample images, and therefore a relatively stable positional relationship is present between the coordinate points. This helps obtain, through fitting, a more appropriate target function related to the labeled point on the first target object and the labeled point on the second target object, further improving accuracy in detecting the target point in the image under test.

In some possible embodiments, the training module further includes: a first inputting module or circuitry, configured to input the sample image into a to-be-trained target point detection model to obtain a predicted target point of the sample image; a first determining module or circuitry, configured to determine a loss value based on the predicted target point and the labeled data; and a first adjusting module or circuitry, configured to adjust the parameter of the target point detection model until the loss value satisfies a first preset loss value to obtain a parameter of the trained target point detection model.

In the foregoing implementations, a training status of a current target point detection model is determined based on a relationship between the loss value and the first preset loss value, and therefore a training process of the target point detection model can be quantized and displayed, so as to determine whether training on the current target point detection model has been completed and output a corresponding parameter after the training has been completed, thereby improving the training efficiency of the target point detection model.

In some possible embodiments, the apparatus further includes: a data labeling module or circuitry, configured to: before the training a parameter of the target point detection model based on a sample image and labeled data, obtain the labeled data based on the sample image and an initial target point detection model.

In the foregoing implementations, the labeled data being obtained based on the sample image and the initial target point detection model makes a relatively stable positional relationship present between the labeled feature point on the first target object and the labeled feature point of the second target object corresponding to a plurality of sample images, enhancing a training effect of the target point detection model.

In some possible embodiments, the data labeling module further includes: a second inputting module, configured to input the sample image into the initial target point detection model to obtain an initial predicted target point of the sample image; a second determining module, configured to determine an initial loss value based on the initial predicted target point and initial labeled data; and a second adjusting module, configured to adjust the initial labeled data to make the initial loss value satisfy a second preset loss value, so as to obtain the labeled data.

In the foregoing implementations, the initial labeled data is adjusted based on a relationship between the initial loss value and the second preset loss value, and therefore a process of determining the labeled data can be quantized and displayed, so as to determine a selection status of current labeled data, thereby improving efficiency of obtaining the labeled data.

In some possible embodiments, the image under test is an image of an adapting piece and a pole that are welded in a battery cell, the first target object is the pole, and the second target object is the adapting piece.

In the foregoing implementations, as a relatively stable positional relationship is present between the pole and the adapting piece, the image of the adapting piece and the pole that are welded in the battery cell can be processed using the target point detection model, so as to accurately detect a target point on the pole and the adapting piece in the image of the adapting piece and the pole that are welded in the battery cell.

In some possible embodiments, the structure-stable specified structure of the first target object includes a groove at a center of the pole.

In the foregoing implementations, as the groove at the center of the pole has stable and symmetrical structure information, a more stable positional relationship is present between the adapting piece and the groove at the center of the pole, so as to better train the target point detection model and accurately detect using the target point detection model, the target point in the image of the adapting piece and the pole that are welded in the battery cell.

In some possible embodiments, the region of the second target object having the structure-stable specified structure includes a tail end of the adapting piece and a region close to a second bend adjacent to the tail end of the adapting piece.

In the foregoing implementations, because the tail end of the adapting piece and the region close to the second bend adjacent to the tail end of the adapting piece has stable structure information, a more stable positional relationship is present between the region and the pole, so as to better train the target point detection model and accurately detect using the target point detection model, the target point in the image of the adapting piece and the pole that are welded in the battery cell.

In some possible embodiments, the labeled feature point on the first target object is a coordinate point of an end point of the groove at the center of the pole; and the labeled feature point on the second target object includes a coordinate point of the tail end of the adapting piece and a coordinate point in the region close to the second bend adjacent to the tail end of the adapting piece.

In the foregoing implementations, the labeled feature point on the first target object is set as the coordinate point of the end point of the groove at the center of the pole, and the labeled feature point on the second target object is set as the coordinate point of the tail end of the adapting piece and the coordinate point in the region close to the second bend adjacent to the tail end of the adapting piece, which makes a stable association relationship present between the feature labeled point on the first target object and the feature point on the second target object, helping the target point detection model learn an association relationship between the feature labeled points.

In some possible embodiments, the target point detection model is a residual neural network.

In the foregoing implementations, the target point detection model being set as the residual neural network can prevent overfitting in the training process, so as to more accurately detect the target point in the image under test.

According to a third aspect, an apparatus for detecting a target point in an image is provided, including a processor and a memory, where the memory is configured to store a program, and the processor is configured to call and run the program to execute the method for detecting a target point in an image according to the foregoing first aspect or any one possible implementation of the first aspect.

According to a fourth aspect, a computer-readable storage medium is provided, including a computer program, where when the computer program runs on a computer, the computer executes the method for detecting a target point in an image according to the foregoing first aspect or any one of the possible implementations of the first aspect.

According to a fifth aspect, a computer program product including instructions is provided, where when the instructions are executed by a computer, the computer executes the method for detecting a target point in an image according to the foregoing first aspect or any one of the possible implementations of the first aspect.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following descriptions show merely some embodiments of this application, and persons of ordinary skill in the art may still derive other drawings from the accompanying drawings without creative efforts.

DESCRIPTION OF EMBODIMENTS

The following further describes the embodiments of this application in detail with reference to the accompanying drawings and examples. The detailed description of embodiments and the accompanying drawings are intended to illustrate the principle of this application, rather than to limit the scope of this application, meaning that this application is not limited to the embodiments described herein.

The embodiments of this application are applicable to an image processing system, including but not limited to infrared imaging-based products. An imaging consistency system of the detection system is applicable to various electronic devices with an imaging consistency apparatus of the detection system. Such electronic device may be a personal computer, a computer workstation, a smart phone, a tablet computer, a smart camera, a media consumption device, a wearable device, a set top box, a game console, an augmented reality (augmented reality, AR) AR/virtual reality (virtual reality, VR) device, an in-vehicle terminal, or the like, which is not limited in the embodiments of this application.

It should be understood that the specific embodiments in this specification are merely intended to help persons skilled in the art better understand the embodiments of this application, rather than to limit the scope of the embodiments of this application.

It should be also understood that sequence numbers of processes in various embodiments of this application do not mean execution sequences. The execution sequences of the processes should be determined based on functions and internal logic of the processes, and should not be construed as any limitation on implementation processes of the embodiments of this application.

It should be further understood that various embodiments described in this specification may be implemented separately or may be implemented in combination with each other, which is not limited in the embodiments of this application.

Unless otherwise defined, all technical and scientific terms used in the embodiments of this application have the same meanings as commonly understood by persons skilled in the art to which this application belongs. The terms used in this application are merely intended to describe specific embodiments, rather than to limit the scope of this application. The term "and/or" used in this application includes any and all combinations of one or more relevant listed items.

Currently, with development of industrial technologies and image processing technologies, more and more industries factories collect image information of products to obtain information of products under test. However, due to influence of human factors in an industrial test procedure and a complex structure of a product under test, it is difficult to accurately detect a target point of an image under test.

The inventors of this application have noted that during detecting of a target point in an image, when a product under test includes an unfixed structure (for example, a part welded to a product) and a region under test is located in the unfixed structure, a target object in an image of the product under test is different in shape and position due to changes of a shooting angle and structural complexity of the product under test, and therefore it is difficult to accurately detect the target point in the image under test.

Based on the above considerations, in order to accurately detect a target point in an image under test, through in-depth research, the inventors have designed a method for detecting a target point in an image to process, using a target point detection model, an image under test that includes a structure-stable target object and a structure-unstable target object, so as to obtain information about the structure-stable target object and information about the structure-unstable target object and then accurately detect the target point in the image under test based on the information about the structure-stable target object and the information about the structure-unstable target object, thereby effectively detecting defects of the product.

Figure 1:
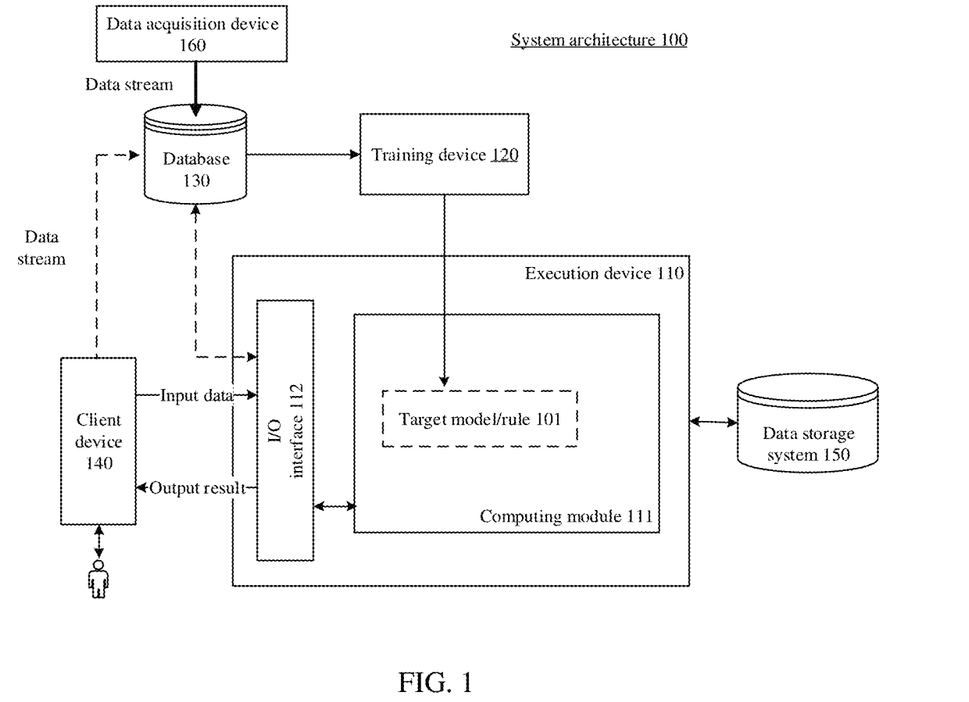
FIG. 1 is a schematic structural diagram of a system architecture provided in this application.

To better understand the solutions in the embodiments of this application, the following briefly describes possible application scenarios in the embodiments of this application with reference to FIG. 1.

As shown in FIG. 1, an embodiment of this application provides a system architecture 100. In FIG. 1, a data acquisition device 160 is configured to collect labeled data and a sample image. For a method for detecting a target point in an image according to this embodiment of this application, it is known that labeled data includes coordinates of labeled points on a first target object and a second target object in a training image.

After the labeled data and the sample image are collected, the data acquisition device 160 stores the sample image and the labeled data into a database 130, and a training device 120 performs training on the labeled data and a training sample that are maintained in the database 130 to obtain a target model/rule 101.

The target model/rule 101 can be used to implement the method for detecting a target point in an image in this embodiment of this application. The target model/rule 101 in this embodiment of this application may specifically be a neural network. It should be noted that in a practical application, training on the sample image and the labeled data that are maintained in the database 130 to obtain the target model/rule 101 may alternatively be model training on a sample image and labeled data that are obtained from cloud or other places. The foregoing description should not constitute any limitation on this embodiment of this application.

The target model/rule 101 obtained through training by the training device 120 may be applied to different systems or devices, for example, applied to an execution device 110 shown in FIG. 1, where the execution device 110 may be a terminal such as a mobile phone terminal, a tablet computer, or a laptop computer, or may be a server or cloud. In FIG. 1, the execution device 110 is configured with an input/output (input/output, I/O) interface 112 for performing data interaction with an external device. A user may input data through the I/O interface 112 from a client device 140, where the input data in this embodiment of this application may include an image under test that is input by the client device 140.

In some implementations, the client device 140 and the execution device 110 may be a same device, for example, the client device 140 and the execution device 110 may be both a terminal device.

In some other implementations, the client device 140 and the execution device 110 may be different devices. For example, the client device 140 is a terminal device and the execution device 110 is a device such as cloud or a server. The client device 140 can interact with the execution device 310 via a communication network of any communication mechanism/communication standard. The communication network may be in a manner of a wide area network, a local area network, or a point-to-point connection, or any combination thereof.

A computing module 111 of the execution device 110 is configured to: based on the input data received by the I/O interface 112, process (for example, the image under test). In a process of performing related processing such as computing by the computing module 111 of the execution device 110, the execution device 110 may call data, code, and the like in a data storage system 150 to perform corresponding processing, and may also store, into the data storage system 150, data, instructions, and the like obtained by the corresponding processing.

Finally, the I/O interface 112 returns a processing result such as the obtained result of the target point in the image under test to the client device 140, so as to provide the processing result to the user.

It should be noted that the training device 120 is capable of generating, based on different training data, a corresponding target model/rule 101 for different targets or different tasks. This corresponding target model/rule 101 may be used for implementing the foregoing objectives or completing the foregoing tasks, so as to provide a required result to the user.

In a case shown in FIG. 1, the user may manually provide the input data, where the manual providing may be performed through a screen that is provided by the I/O interface 112. In another case, the client device 140 may automatically send the input data to the I/O interface 112. If the client device 140 is required to obtain authorization of the user for automatically sending the input data, the user may set a corresponding permission in the client device 140. The user may view, on the client device 140, a result output by the execution device 110. Specific forms of presentation may be specific manners of display, voice, actions, and the like. The client device 140 may alternatively serve as a data acquisition terminal to collect input data that is input into the I/O interface 112 as shown in the figure and an output result that is output by the I/O interface 112, use the collected data as new training data, and store the collected data into the database 130. Certainly, the I/O interface 112 may alternatively collect directly the input data that is input into the I/O interface 112 as shown in the figure and the output result that is output by the I/O interface 112, use the collected data as the new training data, and store the collected data into the database 130, rather than using the client device 140 for collection.

It should be noted that FIG. 1 is only a schematic diagram of a system architecture according to an embodiment of this application. A positional relationship between devices, components, modules, and the like shown in the figure does not constitute any limitation. For example, in FIG. 1, the data storage system 150 is an external memory with respect to the execution device 110. In other cases, the data storage system 150 may alternatively be provided in the execution device 110.

As shown in FIG. 1, based on the target model/rule 101 obtained through training by the training device 120, the target model/rule 101 may be a neural network in this embodiment of this application. Specifically, the neural network in this embodiment of this application may be a convolutional neuron network (convolutional neuron network, CNN), a region CNN (region CNN, RCNN), or another type of neural network, which is not specifically limited in this application.

Figure 2:
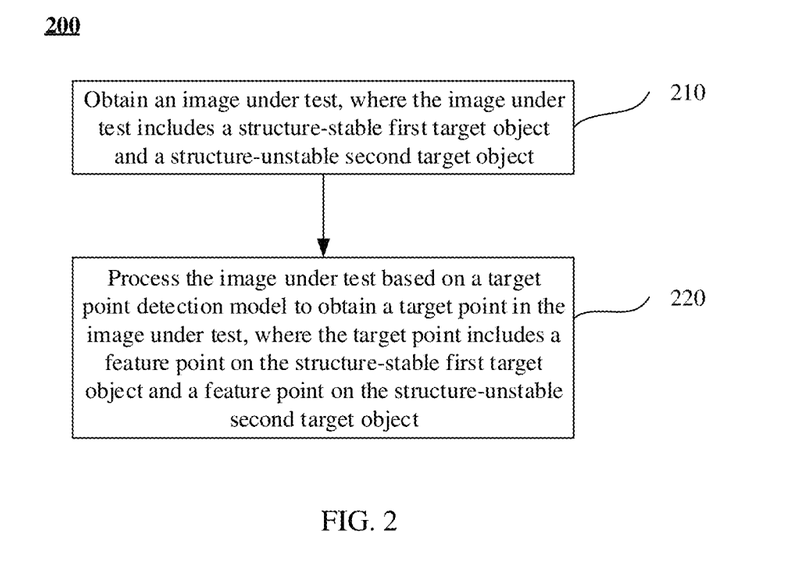
FIG. 2 is a schematic flowchart of a method for detecting a target point in an image according to an embodiment of this application.

As shown in FIG. 2, the following describes main processes of a method for detecting a target point in an image according to an embodiment of this application. The method for detecting a target point in an image includes the following steps.

210. Obtain an image under test, where the image under test includes a structure-stable first target object and a structure-unstable second target object.

Specifically, a type of an image acquisition apparatus can be determined based on a position of a to-be-detected target point in a product under test, and an image (the image under test) of the product under test is obtained by the image acquisition apparatus. For example, when the to-be-detected target point is located inside the product under test and a shell of the product under test is non-transparent, the image under test can be obtained by using an X-ray imaging device; or when the to-be-detected target point is located outside the product under test, the image under test can be obtained by using a charge coupled device (charge coupled device, CCD) camera.

220. Process the image under test based on a target point detection model to obtain a target point in the image under test, where the target point includes a feature point on the structure-stable first target object and a feature point on the structure-unstable second target object.

In this embodiment of this application, in order to detect the target point in the image under test, it is considered that the image under test includes the structure-stable first target object and the structure-unstable second target object, and the target point in the image includes the feature point on the structure-stable first target object and the feature point on the structure-unstable second target object. The structure-stable first target object may be a part not prone to deformation in the product under test, the structure-unstable second target object may be a part prone to deformation in the product under test, and the feature point on the structure-unstable first target object and the feature point on the structure-unstable second target object may be real points on the first target object and the second target object, or may be virtual points in the image under test.

In the technical solution of this application, as the structure-stable first target object has a relatively stable shape in the image under test, the feature point on the structure-stable first target object is also at a relatively stable position in the image under test. In addition, as a relatively stable positional relationship is present between the structure-stable first target object and the structure-unstable second target object in the image under test, a relatively stable positional relationship is also present between the feature point of the structure-stable first target object and the feature point of the structure-unstable second target object in the image under test. Therefore, the image including the structure-stable first target object and the structure-unstable second target object is processed using the target point detection model, so that the target point in the image under test can be accurately detected.

Optionally, in some embodiments of this application, the target point detection model may be a conventional target detection algorithm, or may be a target detection algorithm based on deep learning. An example in which the target point detection model is a neural network (deep learning) is used for description: The image under test is input into the neural network and processed by an input layer, a stacking layer, and an output layer of the neural network. The input layer includes a convolutional layer configured to adjust a size of the image under test so that the stacking layer processes the image under test; the stacking layer includes a plurality of convolutional layers so as to extract information of various feature points in the image under test; and the output layer includes a full connection layer and is configured to output the target point in the image under test based on information of various feature points in the image under test.

Optionally, in some possible embodiments, the first target object has a structure-stable specified structure, and a partial region of the second target object has a structure-stable specified structure.

Specifically, the structure-stable specified structure of the first target object may be a part symmetric in shape and not prone to deformation in the product under test, and the structure-stable specified structure of the partial region of the second target object may be a specified structure (for example, a bend of an adapting piece in a battery cell) of a partial region of a part prone to deformation in the product under test.

It can be understood that in an industrial test procedure, because a shooting angle may change, if the first object has the structure-stable specified structure and the partial region of the second target object has the structure-stable specified structure, and the relatively stable image of the product under test can be obtained, that is, first target objects and second target objects of a plurality of images under test have a small difference in shape, positional relationships between various portions of the first target object and various portions of the second target object are relatively fixed.

In the foregoing implementations, the first target object having information about the structure-stable specified structure and the partial region of the second target object also having information about the structure-stable specified structure not only enhance stability of shapes of the first target object and the second target object in the image under test, but also enhance stability of a positional relationship between the first target object and the second target object. In this way, the image under test is processed using the target point detection model, improving accuracy in detecting the target point in the image.

Optionally, in some possible embodiments, the method for detecting a target point in an image further includes: training a parameter of the target point detection model based on a sample image and labeled data, where the sample image includes the first target object and the second target object, and the labeled data includes a labeled feature point on the first target object and a labeled feature point on the second target object.

For example, the sample image and the labeled data are input into a to-be-trained target point detection model, and the target point detection model is trained based on a preset hyper-parameter, so as to adjust the parameter of the target point detection model and obtain, through fitting, a target function related to the target point in the image under test.

In the foregoing implementations, as the structure-stable first target object has a relatively stable shape in the sample image, the labeled feature point on the structure-stable first target object is also at a relatively stable position in the sample image. In addition, as a relatively stable positional relationship is present between the structure-stable first target object and the structure-unstable second target object in the sample image, a relatively stable positional relationship is also present between the labeled feature point of the structure-stable first target object and the labeled feature point of the structure-unstable second target object in the sample image. Therefore, a target function related to a labeled point on the first target object and a labeled point on the second target object can be obtained through fitting using the parameter of the target point detection model being trained through the sample image having the foregoing features and the labeled data, thereby accurately detecting the target point in the image under test.

Optionally, in some possible embodiments, the labeled feature point on the first target object is at least one coordinate point on the first target object; and the labeled feature point on the second target object is at least one coordinate point on a region of the second target object having a specified structure.

It can be understood that when the target object has a stable specified structure or a region having a specified structure, information about any labeled feature point on the stable specified structure or the region having the specified structure is also relatively fixed. In addition, with an increased quantity of the labeled feature points on the stable specified structure or the region having the specified structure, positions of the labeled feature points become more associated.

In the foregoing implementations, as the structure-stable first target object has a relatively stable shape in a plurality of sample images, at least one coordinate point on the structure-stable first target object is also at a relatively stable position in the plurality of sample images. In addition, as the region of the structure-unstable second target object having a specified structure has a relatively fixed shape in the plurality of sample images, at least one coordinate point in the region of the structure-unstable second target object having a specified structure is at a relatively fixed position in the plurality of sample images, and therefore a relatively stable positional relationship is present between the coordinate points. This helps obtain, through fitting, a more appropriate target function related to the labeled point on the first target object and the labeled point on the second target object, further improving accuracy in detecting the target point in the image under test.

Further, in some possible embodiments, the training a parameter of the target point detection model based on a sample image and labeled data includes: inputting the sample image into a to-be-trained target point detection model to obtain a predicted target point of the sample image; determining a loss value based on the predicted target point and the labeled data; and adjusting the parameter of the target point detection model until the loss value satisfies a first preset loss value to obtain a parameter of the trained target point detection model.

For example, the sample images are input into a to-be-trained target point identification model (for example, a neural network) to obtain predicted target points. The predicted target points and labeled data are input into loss functions (for example, an L1 loss function and an L2 loss function) to determine a loss value. A learning status of the to-be-trained target point identification model is determined based on whether the loss value satisfies a first preset loss value. When the loss value does not satisfy the first preset loss value, a parameter of the target point identification model is adjusted based on a preset hyper-parameter until the loss value satisfies the first preset loss value, indicating that training of the target point identification model ends and the parameter of the target point detection model is obtained.

In the foregoing implementations, a training status of a current target point detection model is determined based on a relationship between the loss value and the first preset loss value, and therefore a training process of the target point detection model can be quantized and displayed, so as to determine whether training on the current target point detection model has been completed and output a corresponding parameter after the training has been completed, thereby improving the training efficiency of the target point detection model.

Optionally, in some possible embodiments, before the training a parameter of the target point detection model based on a sample image and labeled data, the method further includes: obtaining the labeled data based on the sample image and an initial target point detection model.

It should be noted that, in some application scenarios, for example, when an internal structure of a product under test is complex and a to-be-detected target point is located inside the product under test, a corresponding image under test is typically obtained by using an X-ray imagining device. However, due to particularity of imaging principles of the X-ray imagining device and the to-be-detected target point being located on a structurally irregular and deformable part (the second target object), a lot of noise similar to the shape of the second target object may exist in the image under test. In this case, the labeled data obtained directly may be poor in consistency. That is, it is difficult to ensure that labeled data of a plurality of sample images is all located at a same position on the first target object and the second target object. To resolve the problems in the foregoing application scenarios, in an implementation of this application, the sample image is input into an initial target point detection model; and whether current labeled data is appropriate is determined based on whether an output result of the initial target point detection model satisfies a preset condition.

In the foregoing implementations, the labeled data being obtained based on the sample image and the initial target point detection model makes a relatively stable positional relationship present between the labeled feature point on the first target object and the labeled feature point of the second target object corresponding to a plurality of sample images, enhancing a training effect of the target point detection model.

Optionally, in some possible embodiments, the obtaining the labeled data based on the sample image and an initial target point detection model includes: inputting the sample image into the initial target point detection model to obtain an initial predicted target point of the sample image; determining an initial loss value based on the initial predicted target point and initial labeled data; and adjusting the initial labeled data to make the initial loss value satisfy a second preset loss value, so as to obtain the labeled data.

For example, the sample image is input into the initial target point identification model to obtain an initial predicted target point. The initial predicted target point and initial labeled data are input into loss functions (for example, an L1 loss function and an L2 loss function) to determine an initial loss value. Consistency of the initial labeled data is determined based on whether the initial loss value satisfies the second preset loss value. When the initial loss value does not satisfy the second preset loss value, the initial labeled data can be adjusted in a manner of row or column (for example, the initial labeled data (1, 20), (15, 7) is adjusted to (1, 21), (15, 8) or (2, 20), (16, 7)) until the initial loss value satisfies the second preset loss value, and the initial data is used as the labeled data.

In the foregoing implementations, the initial labeled data is adjusted based on a relationship between the initial loss value and the second preset loss value, and therefore a process of determining the labeled data can be quantized and displayed, so as to determine a selection status of current labeled data, thereby improving efficiency of obtaining the labeled data.

In the foregoing implementations, for adjustment of the initial labeled data based on the relationship between the initial loss value and the second preset loss value, labeled data with strong consistency can be selected, making the labeled data stably associated, so as to better train the target point detection model and detect the target point in the image under test using the target point detection model.

In some other application scenarios, for example, when some target points under test are located on a part (the second target object) in an internal welding region of the product under test, an external force applied during welding may cause the second target object to deform, further increasing instability of position information of a labeled point.

Therefore, in some possible embodiments, when the image under test is an image of an adapting piece and a pole that are welded in a battery cell, the first target object is the pole, and the second target object is the adapting piece.

It can be understood that when the image under test is an image of the adapting piece and the pole that are welded in the battery cell, the pole has stable structure information, the adapting piece has unstable structure information, and a relatively stable positional relationship is present between the pole and the adapting piece, so that a relatively stable positional relationship is also present between a labeled point on the pole and a labeled point on the adapting piece.

Therefore, in the foregoing implementations, due to the relatively stable positional relationship between the pole and the adapting piece, with the image of the adapting piece and the pole that are welded in the battery cell being processed using the target point detection model, target points on the pole and the adapting piece in the image of the adapting piece and the pole that are welded in the battery cell can accurately be detected.

Optionally, in some possible embodiments, the structure-stable specified structure of the first target object includes a groove at a center of the pole.

Figure 5:
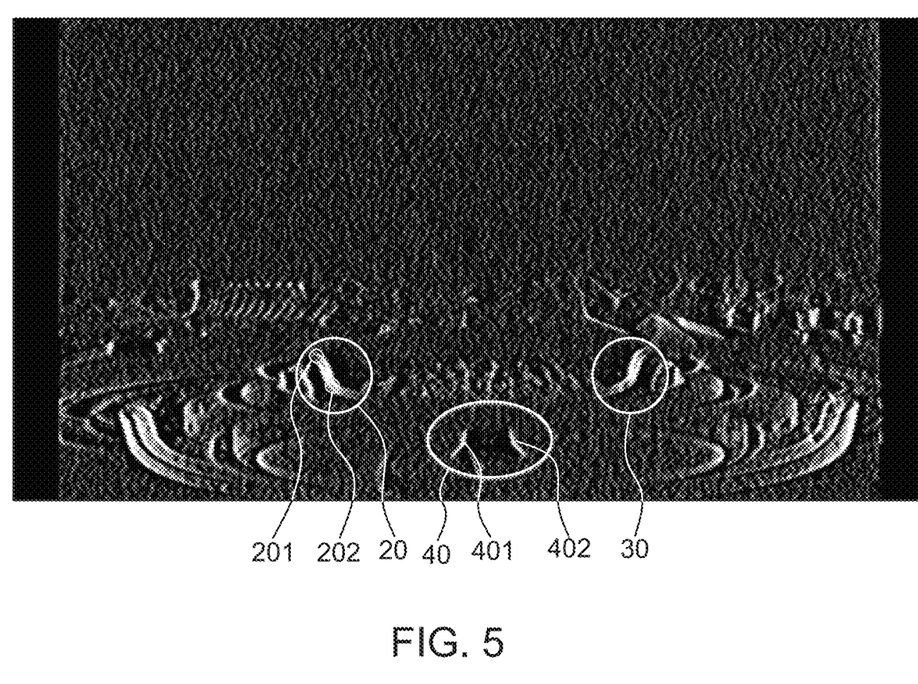
FIG. 5 is a schematic diagram of a training image according to a specific embodiment of this application.

It can be understood that different types of batteries have different internal structures. In the embodiments of this application, a battery type is used as an example for description. As shown in FIG. 5, a shape of the groove at the center of the pole in the image under test is similar to a splayed portion in a circle 40. A distance between a left structure 401 and a right structure 402 of the splayed portion is consistent in a plurality of images (images under test and trained images), and the left structure 401 and the right structure 402 of the splayed portion are relatively fixed in shape, so that a relatively fixed positional relationship is present between the groove at the center of the pole and the adapting piece.

Therefore, in the foregoing implementations, as the groove at the center of the pole has stable and symmetrical structure information, a more stable positional relationship is present between the adapting piece and the groove at the center of the pole, so as to better train the target point detection model and accurately detect using the target point detection model, the target point in the image of the adapting piece and the pole that are welded in the battery cell.

In some possible embodiments, the region of the second target object having the structure-stable specified structure includes a tail end of the adapting piece and a region close to a second bend adjacent to the tail end of the adapting piece.

A battery type is used as an example for description. As shown in FIG. 5, a circle 20 and a circle 30 both include an adapting piece. The adapting piece in the circle 20 is used as an example for description. The adapting piece in the circle 30 and the adapting piece in the circle 20 are symmetrical. Specifically, the tail end of the adapting piece is a region 201, and the region close to the second bend adjacent to the tail end of the adapting piece is a region 202, where sizes of the region 201 and the region 202 can be determined based on a type of the adapting piece.

In the foregoing implementations, because the tail end of the adapting piece and the region close to the second bend adjacent to the tail end of the adapting piece has stable structure information, a more stable positional relationship is present between the region and the pole, so as to better train the target point detection model and accurately detect using the target point detection model, the target point in the image of the adapting piece and the pole that are welded in the battery cell.

Further, in some possible embodiments, the labeled feature point on the first target object is a coordinate point of an end point of the groove at the center of the pole; and the labeled feature point on the second target object includes a coordinate point of the tail end of the adapting piece and a coordinate point in the region close to the second bend adjacent to the tail end of the adapting piece.

Figure 3:
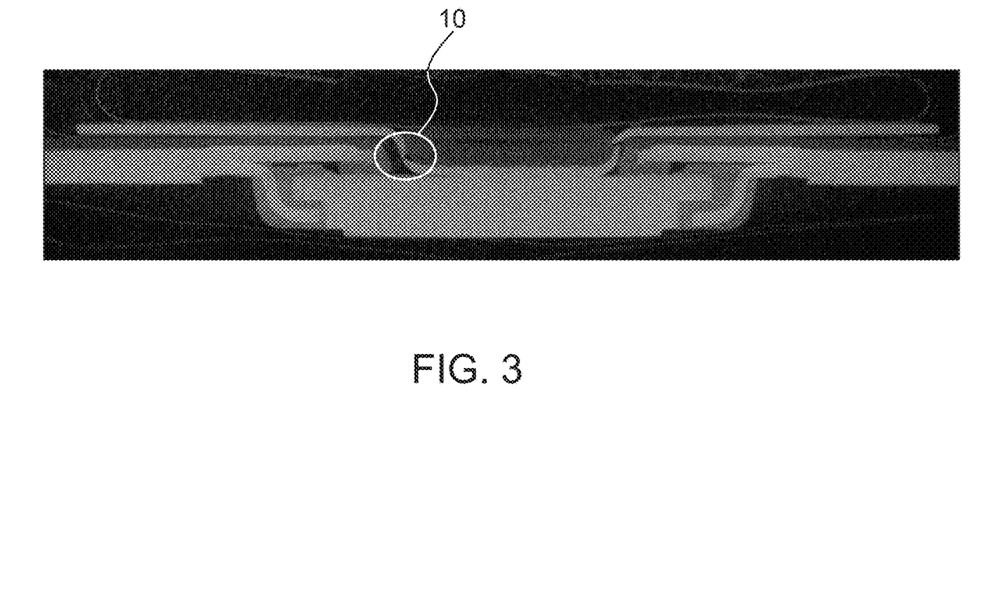
FIG. 3 is a partial image of an adapting piece and a pole that are welded in a battery cell according to an embodiment of this application.
Figure 4:
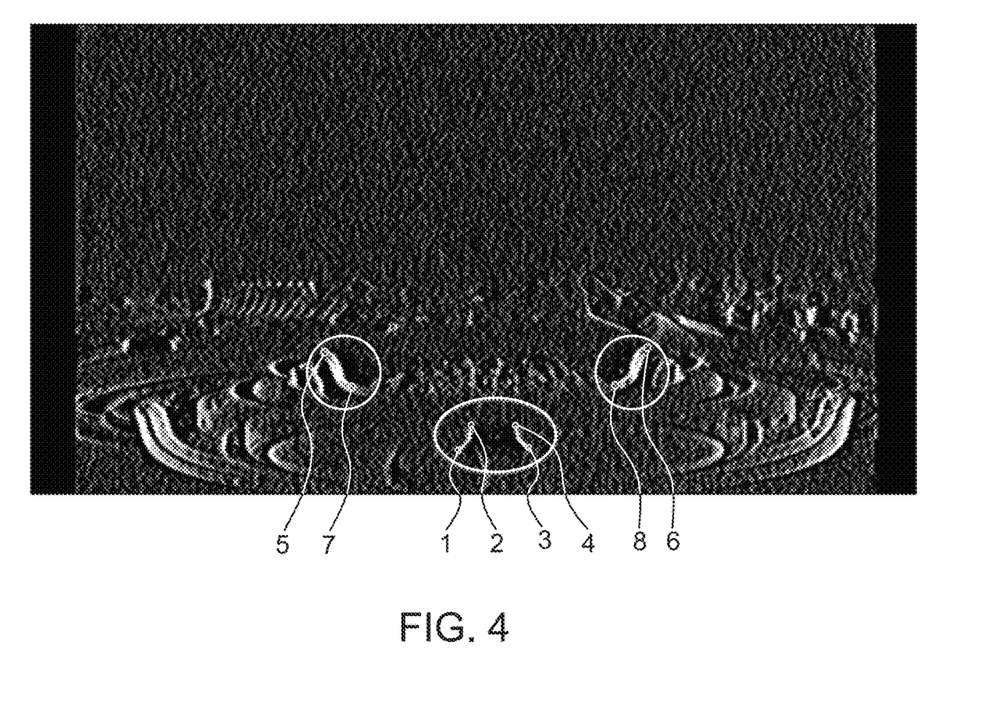
FIG. 4 is a schematic diagram of labeled points on a first target object and a second target object according to an embodiment of this application.

For example, as shown in FIG. 3 and FIG. 4, a circle 10 represents a welding region of the adapting piece; an end point 1, an end point 2, an end point 3, and an end point 4 are coordinate points corresponding to the end points of the groove at the center of the pole; an end point 5 and an end point 6 are coordinate points of the tail ends of the adapting pieces; and an end point 7 and an end point 8 are coordinate points in the regions close to the second bends adjacent to the tail ends of the adapting pieces.

Figure 7:
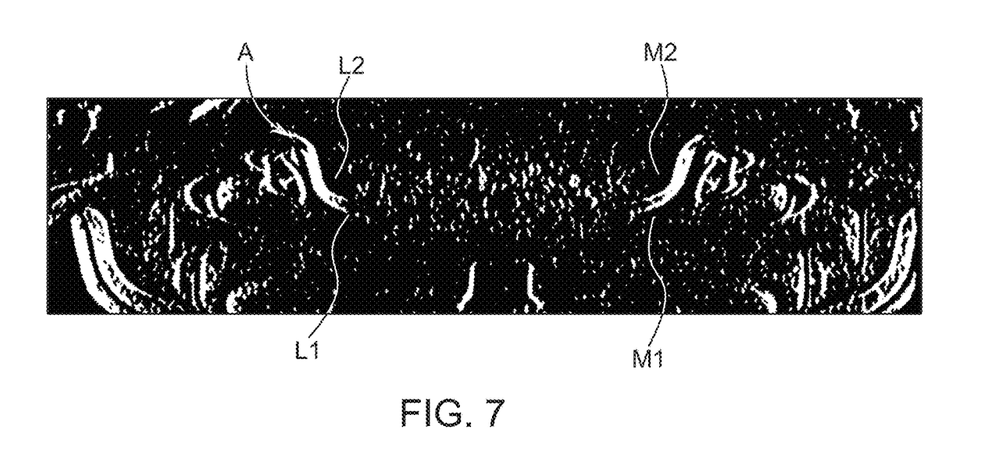
FIG. 7 is a schematic diagram of a positional relationship between labeled points according to an embodiment of this application.

It can be understood that the end point 1, the end point 2, the end point 3, and the end point 4 are relatively stable feature labeled points (a positional relationship between the four end points is relatively stable); the end point 5 and the end point 6 are located in a structure-stable region of the adapting piece (a protrusion A of the tail end of the adapting piece) and are also relatively stable feature labeled points (a positional relationship between the two end points and a positional relationship between the end point 1, the end point 2, the end point 3, and the end point 4 are both relatively stable); and the end point 7 and the end point 8 have corresponding positional relationships with the relatively stable end point 5 and end point 6, that is, the end point 7 is a coordinate point at which an extension line L1 of an inner side of a waist portion of a left adapting piece intersects with an extension line L2 of the center of a middle end of the adapting piece (as shown in FIG. 7), and the end point 8 is a coordinate point at which an extension line M1 of an inner side of a waist portion of a right adapting piece intersects with an extension line M2 of the center of a middle end of the adapting piece. Therefore, during training of a target point identification model, when the coordinates of the foregoing eight end points (the eight end points form a series-connected ordered large feature point relationship) are input into the to-be-trained target point identification model, the relationship between various end points can be learned, so as to detect the target point in the image under test using the trained target point identification model.

It should be noted that during training of the target point identification model, initial positions can be initially determined based on information about the end point 1 and the end point 2, the end point 5 and the end point 7 (positions of the left adapting piece) are determined based on structure information of the second target object (the left adapting piece), the end point 5 and the end point 7 are modified based on information about the end point 3 and the end point 4 so as to obtain a more accurate position of the left adapting piece, and in addition, the end point 6 and the end point 8 are determined based on structure information of the second target object (the right adapting piece). In this way, the relationship between the eight end points is determined.

In the foregoing implementations, the labeled feature point on the first target object is set as the coordinate point of the end point of the groove at the center of the pole, and the labeled feature point on the second target object is set as the coordinate point of the tail end of the adapting piece and the coordinate point in the region close to the second bend adjacent to the tail end of the adapting piece. In this way, information about the target point in the image under test can be effectively learned, so as to accurately detect the target point in the image under test.

Optionally, in some possible embodiments, the target point detection model may be a residual neural network.

It should be noted that the residual neural network (Residual Network, ResNet) may be ResNet18, ResNet34, ResNet50, ResNet101, ResNet152, or the like. A quantity of layers of the residual neural network is not limited herein and may be selected based on an actual requirement.

In the foregoing implementations, the target point detection model being set as the residual neural network can prevent overfitting in the training process, so as to more accurately detect the target point in the image under test.

Optionally, in some possible embodiments, the obtaining an image under test includes: obtaining an original image; and converting a format of the original image to a PNG format to obtain the image under test.

The original image is a large-size image (for example, a tagged image file format (Tagged Image File Format, TIFF)). For example, TIFF depth information data obtained by the image acquisition apparatus is converted to a portable network graphics (Portable Network Graphics, PNG) format so as to obtain the image under test.

In the foregoing embodiments, through format conversion, a storage space of the image can be reduced while the data feature required can be retained.

For ease of understanding by persons skilled in the art, this application provides an embodiment in a specific application scenario.

Figure 6:
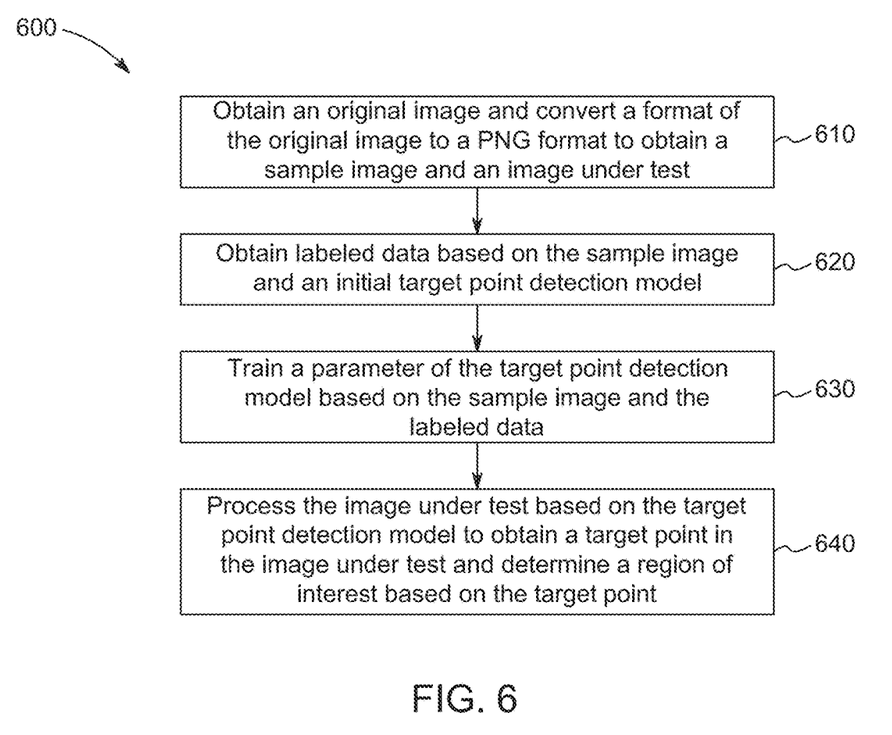
FIG. 6 is a schematic flowchart of a method for detecting a target point in an image according to a specific embodiment of this application.

As shown in FIG. 6, a method 600 for detecting a target point in an image includes the following steps.

610. Obtain an original image and convert a format of the original image to a PNG format to obtain a sample image and an image under test.

Specifically, image data (the sample image and the image under test, as shown in FIG. 5) of a battery cell, for example, 6-channel 8-bit TIFF depth information data, is collected based on an X-ray imaging apparatus; and the TIFF depth information data is converted to a 4-channel 8-bit PNG format. In this way, data storage required can be reduced by 92% while data features required can be retained.

620. Obtain labeled data based on the sample image and an initial target point detection model.

Specifically, the sample image is input into a ResNet18 (the initial target point detection model), and an initial predicted target point of the sample image is obtained through feature extraction by the ResNet18. The initial predicted target point and initial labeled data are input into a loss function Smooth L1 Loss to determine an initial loss value. When the loss function is non-convergent, that is, an initial loss value obtained through a corresponding number of iterations is greater than or equal to a second preset loss value (for example, 0.01), the initial labeled data can be adjusted in a manner of row or column, the initial loss value is recalculated based on the adjusted labeled data in the foregoing manner, and whether a current initial loss value is less than the second preset loss value is determined; and if the current initial loss value is less than the second preset loss value, current labeled data is used as labeled data for training the target point detection model. As shown in FIG. 5, the second target object (the adapting piece) may be portions with a similar structure in a circle 20 and a circle 30, and the partial region of the first target object (a groove of the pole) may be a splayed portion in a circle 40, so that the initial target point is an arbitrary point on the first target object and the second target object. The labeled data may be stored in a JSON format.

630. Train a parameter of the target point detection model based on the sample image and the labeled data.

Specifically, the first preset loss value and the second preset loss value may be set to be a same value, and same as the initial target point detection model, the target point detection model may be set to be a ResNet18. A hyper-parameter of the ResNet18 during training and a hyper-parameter of the ResNet18 during determining of the labeled data are set to be the same and remain unchanged, that is, neurons in the ResNet18 have different weights during training and determining of the labeled data. The training process is the same as the process of determining the labeled data in 620, which is not described herein again.

640. Process the image under test based on the target point detection model to obtain a target point in the image under test and determine a region of interest based on the target point.

The image under test is input into the ResNet18, feature extraction is performed by the ResNet18 to obtain the target point in the image under test, and the region of interest is determined based on the target point in the image under test, for example, an identification box may be determined based on a feature point on the second target object, so as to determine the region of interest.

In this embodiment, a labeled point on the structure-stable first target is added when the target point in the image under test is determined based on a Euclid mean square root of a coordinate of the target point and the labeled data, effectively improving accuracy in detecting the target point (as compared with the labeled point on the structure-stable first target being not added, the accuracy in detecting the target point is improved by 26.5%). This avoids misjudgment of defects of products under test caused by inaccurate detection of the target point, and improves adaptability of the target point detection model to different products. It should be noted that a smaller Euclid mean square root means higher accuracy in detecting the target point detection model.

It should be noted that in the method for detecting a target point in an image provided in this embodiment of this application, when the product under test is changing, only small-batch data needs to be adapted, thereby improving robustness and generalization capability in detecting the target point in the image.

Figure 8:
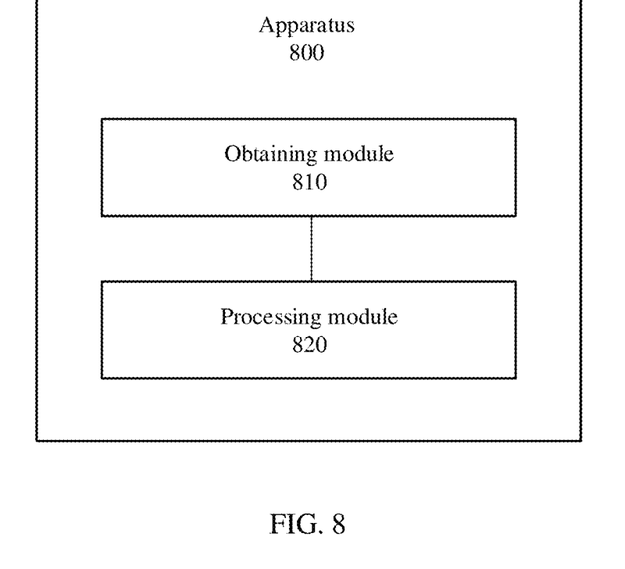
FIG. 8 is a schematic structural block diagram of an apparatus for detecting a target point in an image according to an embodiment of this application.

FIG. 8 is a schematic block diagram of an apparatus 800 for detecting a target point in an image according to an embodiment of this application. The apparatus 800 can perform the method for detecting a target point in an image in the foregoing embodiments of this application. For example, the apparatus 800 may be the foregoing processing apparatus 110.

As shown in FIG. 8, the apparatus 800 includes:
an obtaining module 810, configured to obtain an image under test, where the image under test includes a structure-stable first target object and a structure-unstable second target object; and a processing module 820, configured to process the image under test based on a target point detection model to obtain a target point in the image under test, where the target point includes a feature point on the structure-stable first target object and a feature point on the structure-unstable second target object.

Optionally, in some possible embodiments, the first target object has a specified structure, and a partial region of the second target object has a structure-stable specified structure.

Optionally, in some possible embodiments, the apparatus further includes: a training module, configured to train a parameter of the target point detection model based on a sample image and labeled data, where the sample image includes a first target object and a second target object, and the labeled data includes a labeled feature point on the first target object and a labeled feature point on the second target object.

Optionally, in some possible embodiments, the labeled feature point on the first target object is at least one coordinate point on the first target object; and the labeled feature point on the second target object is at least one coordinate point on a region of the second target object having a specified structure.

Optionally, in some possible embodiments, the training module further includes: a first inputting module, configured to input the sample image to a to-be-trained target point detection model to obtain a predicted target point of the sample image; a first determining module, configured to determine a loss value based on the predicted target point and the labeled data; and a first adjusting module, configured to adjust the parameter of the target point detection model until the loss value satisfies a first preset loss value to obtain a parameter of the trained target point detection model.

Optionally, in some possible embodiments, the apparatus further includes: a data labeling module, configured to: before the training a parameter of the target point detection model based on a sample image and labeled data, obtain the labeled data based on the sample image and an initial target point detection model.

Optionally, in some possible embodiments, the data labeling module further includes: a second inputting module, configured to input the sample image into the initial target point detection model to obtain an initial predicted target point of the sample image; a second determining module, configured to determine an initial loss value based on the initial predicted target point and initial labeled data; and a second adjusting module, configured to adjust the initial labeled data to make the initial loss value satisfy a second preset loss value, so as to obtain the labeled data.

Optionally, in some possible embodiments, the image under test is an image of an adapting piece and a pole that are welded in a battery cell, the first target object is the pole, and the second target object is the adapting piece.

Optionally, in some possible embodiments, the structure-stable specified structure of the first target object includes a groove at a center of the pole.

Optionally, in some possible embodiments, the region of the second target object having the structure-stable specified structure includes a tail end of the adapting piece and a region close to a second bend adjacent to the tail end of the adapting piece.

Optionally, in some possible embodiments, the labeled feature point on the first target object is a coordinate point of an end point of the groove at the center of the pole; and the labeled feature point on the second target object includes a coordinate point of the tail end of the adapting piece and a coordinate point in the region close to the second bend adjacent to the tail end of the adapting piece.

Optionally, in some possible embodiments, the target point detection model is a residual neural network.

Figure 9:
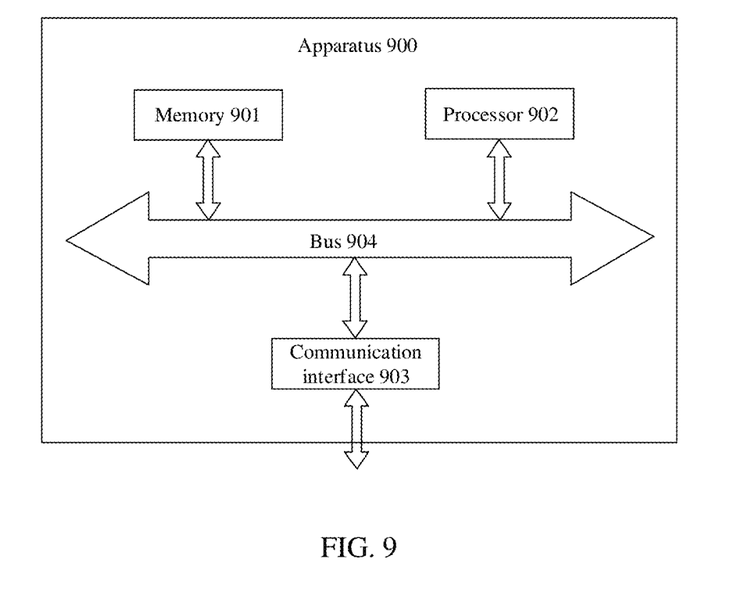
FIG. 9 is a schematic diagram of a hardware structure of an apparatus for detecting a target point in an image according to an embodiment of this application.

FIG. 9 is a schematic diagram of a hardware structure of an apparatus for detecting a target point in an image according to an embodiment of this application. As shown in FIG. 9, an apparatus 900 for detecting a target point in an image includes a memory 901, a processor 902, a communication interface 903, and a bus 904. The memory 901, the processor 902, and the communication interface 903 implement a communication connection to each other by using the bus 904.

The memory 901 may be a read-only memory (read-only memory, ROM), a static storage device, a random access memory (random access memory, RAM), or the like. The memory 901 can store a program. When the program stored in the memory 901 is executed by the processor 902, the processor 902 and the communication interface 903 are configured to perform various steps of the method for detecting a target point in an image according to the embodiments of this application.

The processor 902 may be a general central processing unit (central processing unit, CPU) or a microprocessor, uses an application specific integrated circuit (application specific integrated circuit, ASIC), a graphics processing unit (graphics processing unit, GPU), or one or more integrated circuits, and is configured to execute related programs, so as to implement functions executed by units in the apparatus for detecting the target point in the image according to the embodiments of this application or implement the method for detecting a target point in an image according to the embodiments of this application.

The processor 902 may alternatively be an integrated circuit chip with a signal processing capability. During implementation, the steps of the method for detecting a target point in an image according to the embodiments of this application may be implemented by hardware integrated logic circuits in the processor 902 or instructions in the form of software.

The foregoing processor 902 may alternatively be a general-purpose processor, a digital signal processor (digital signal processing, DSP), an ASIC, a field programmable gate array (field programmable gate array, FPGA) or another programmable logic device, a discrete gate or transistor logic device, or a discrete hardware component. The methods, steps, and logical block diagrams disclosed in the embodiments of this application can be implemented or executed. The general-purpose processor may be a microprocessor or any conventional processor. The steps of the method disclosed with reference to the embodiments of the application may be directly implemented by a hardware processor, or may be implemented by a combination of hardware and a software module in a processor. The software module may be located in a storage medium mature in the art, such as a random access memory, a flash memory, a read-only memory, a programmable read-only memory or an electrically erasable programmable memory, or a register. The storage medium is located in the memory 901, and the processor 902 reads information in the memory 901, and completes functions executed by the units included in the apparatus for detecting the target point in the image according to the embodiments of this application or perform the method for detecting a target point in an image according to the embodiments of this application in combination with its hardware.

The communication interface 903 uses transceiver apparatuses such as, but not limited to, transceivers to implement communication between the apparatus 900 and other devices or communication networks. For example, traffic data of an unknown device can be obtained by the communication interface 903.

The bus 904 may include paths used for transmitting information between components of the apparatus 900 (for example, the memory 901, the processor 902, and the communication interface 903).

It should be noted that although in the foregoing apparatus 900, only the memory, the processor, and the communication interface are shown, during a specific implementation, persons skilled in the art should understood that the apparatus 900 may further include other components required for normal operation. In addition, based on specific requirements, persons skilled in the art should understood that the apparatus 900 may further include hardware components implementing other additional functions. Further, persons skilled in the art should understood that the apparatus 900 may alternatively include only components required for implementing the embodiments of this application, but does not need to include all the components shown in FIG. 9.

An embodiment of this application further provides a computer-readable storage medium configured to store program code to be executed by a device, where the program code includes instructions used for performing the steps of the foregoing method for detecting a target point in an image.

An embodiment of this application further provides a computer program product. The computer program product includes a computer program stored in a computer-readable storage medium, and the computer program includes program instructions. When the program instructions are executed by a computer, the computer performs the foregoing method for detecting a target point in an image.

The foregoing computer-readable storage medium may be a transitory computer-readable storage medium or a non-transitory computer-readable storage medium.

It may be clearly understood by persons skilled in the art that, for the purpose of convenient and brief description, for a detailed working process of the foregoing apparatus, reference may be made to a corresponding process in the foregoing method embodiments, and details are not described herein again.

In the description of this application, it should be noted that, unless otherwise stated, "a plurality of" means at least two; and the orientations or positional relationships indicated by the terms "upper", "lower", "left", "right", "inside", "outside", and the like are merely for ease and brevity of description of this application rather than indicating or implying that the apparatuses or components mentioned must have specific orientations or must be constructed or manipulated according to specific orientations. These terms shall therefore not be construed as limitations on this application. In addition, the terms "first", "second", and "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The orientation terms appearing in the following description all are directions shown in the figures, and do not limit the specified structure of the application. In the description of this application, it should also be noted that unless otherwise specified and defined explicitly, the terms "mount", "connect", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

Although this application has been described with reference to the preferred embodiments, various modifications to this application and replacements with equivalents of the components herein can be made without departing from the scope of this application. In particular, as long as there is no structural conflict, the various technical features mentioned in the embodiments can be combined in any manners. This application is not limited to the specific embodiments disclosed in this specification, but includes all technical solutions falling within the scope of the claims.

The invention claimed is:

1. A method for detecting a target point in an image, characterized in that the method comprises:
   obtaining an image under test, wherein the image under test comprises a structure-stable first target object and a structure-unstable second target object;
   processing the image under test based on a target point detection model to obtain a target point in the image under test, wherein the target point comprises a feature point on the structure-stable first target object and a feature point on the structure-unstable second target object; and training a parameter of the target point detection model based on a sample image and labeled data, wherein the sample image comprises the first target object and the second target object, and the labeled data comprises a labeled feature point on the first target object and a labeled feature point on the second target object, wherein the training a parameter of the target point detection model based on a sample image and labeled data comprises:

inputting the sample image into a to-be-trained target point detection model to obtain a predicted target point of the sample image;

determining a loss value based on the predicted target point and the labeled data; and adjusting the parameter of the target point detection model until the loss value satisfies a first preset loss value to obtain a parameter of the trained target point detection model.

2. The method according to claim 1, characterized in that the first target object has a structure-stable specified structure, and a partial region of the second target object has a structure-stable specified structure.

3. The method according to claim 1, characterized in that the method further comprises:

the labeled feature point on the first target object is at least one coordinate point on the first target object; and the labeled feature point on the second target object is at least one coordinate point on a region of the second target object having a specified structure.

4. The method according to claim 1, characterized in that before the training a parameter of the target point detection model based on a sample image and labeled data, the method further comprises:

obtaining the labeled data based on the sample image and an initial target point detection model.

5. The method according to claim 4, characterized in that the obtaining the labeled data based on the sample image and an initial target point detection model comprises:

inputting the sample image into the initial target point detection model to obtain an initial predicted target point of the sample image;

determining an initial loss value based on the initial predicted target point and initial labeled data; and adjusting the initial labeled data to make the initial loss value satisfy a second preset loss value, so as to obtain the labeled data.

6. The method according to claim 1, characterized in that the image under test is an image of an adapting piece and a pole that are welded in a battery cell, the first target object is the pole, and the second target object is the adapting piece.

7. The method according to claim 6, characterized in that the structure-stable specified structure of the first target object comprises a groove at a center of the pole.

8. The method according to claim 6, characterized in that the region of the second target object having the structure-stable specified structure comprises a tail end of the adapting piece and a region close to a second bend adjacent to the tail end of the adapting piece.

9. The method according to claim 8, characterized in that the labeled feature point on the first target object is a coordinate point of an end point of the groove at the center of the pole; and the labeled feature point on the second target object comprises a coordinate point of the tail end of the adapting piece and a coordinate point in the region close to the second bend adjacent to the tail end of the adapting piece.

10. The method according to claim 1, characterized in that the target point detection model is a residual neural network.

11. An apparatus for detecting a target point in an image, characterized by comprising a processor and a memory, wherein the memory is configured to store a program, and the processor is configured to call and run the program to execute the method for detecting a target point in an image according to claim 1.

12. A non-transitory computer-readable storage medium, characterized by comprising a computer program, wherein when the computer program runs on a computer, the computer executes the method for detecting a target point in an image according to claim 1.

13. An apparatus for detecting a target point in an image, characterized in that the apparatus comprises:

an obtaining circuitry, configured to obtain an image under test, wherein the image under test comprises a structure-stable first target object and a structure-unstable second target object;

a processing circuitry, configured to process the image under test based on a target point detection model to obtain a target point in the image under test, wherein the target point comprises a feature point on the structure-stable first target object and a feature point on the structure-unstable second target object; and a training circuitry, configured to train a parameter of the target point detection model based on a sample image and labeled data, wherein the sample image comprises the first target object and the second target object, and the labeled data comprises a labeled feature point on the first target object and a labeled feature point on the second target object, wherein the training circuitry further comprises:

a first inputting circuitry, configured to input the sample image into a to-be-trained target point detection model to obtain a predicted target point of the sample image;

a first determining circuitry, configured to determine a loss value based on the predicted target point and the labeled data; and a first adjusting circuitry, configured to adjust the parameter of the target point detection model until the loss value satisfies a first preset loss value to obtain a parameter of the trained target point detection model.

14. The apparatus according to claim 13, characterized in that the first target object has a specified structure, and a partial region of the second target object has a structure-stable specified structure.

15. The apparatus according to claim 13, characterized in that the labeled feature point on the first target object is at least one coordinate point on the first target object; and the labeled feature point on the second target object is at least one coordinate point on a region of the second target object having a specified structure.

16. The apparatus according to claim 13, characterized in that the apparatus further comprises:

a data labeling circuitry, configured to: before the training a parameter of the target point detection model based on a sample image and labeled data, obtain the labeled data based on the sample image and an initial target point detection model.

17. The apparatus according to claim 16, characterized in that the data labeling module further comprises:

a second inputting circuitry, configured to input the sample image into the initial target point detection model to obtain an initial predicted target point of the sample image;

a second determining circuitry, configured to determine an initial loss value based on the initial predicted target point and initial labeled data; and a second adjusting circuitry, configured to adjust the initial labeled data to make the initial loss value satisfy a second preset loss value, so as to obtain the labeled data.

18. The apparatus according to claim 13, characterized in that the image under test is an image of an adapting piece and a pole that are welded in a battery cell, the first target object is the pole, and the second target object is the adapting piece.

19. The apparatus according to claim 18, characterized in that the structure-stable specified structure of the first target object comprises a groove at a center of the pole.

20. The apparatus according to claim 18, characterized in that the region of the second target object having the structure-stable specified structure comprises a tail end of the adapting piece and a region close to a second bend adjacent to the tail end of the adapting piece.

21. The apparatus according to claim 20, characterized in that the labeled feature point on the first target object is a coordinate point of an end point of the groove at the center of the pole; and the labeled feature point on the second target object comprises a coordinate point of the tail end of the adapting piece and a coordinate point in the region close to the second bend adjacent to the tail end of the adapting piece.

22. The apparatus according to claim 13, characterized in that the target point detection model is a residual neural network.

\* \* \* \* \*